US009725342B2

(12) United States Patent
Van Zutphen et al.

(10) Patent No.: US 9,725,342 B2
(45) Date of Patent: Aug. 8, 2017

(54) PHOSPHINE-BASED METAL BINDING PARTICLES AND METHODS FOR PREPARING AND USING

(71) Applicant: MAGPIE POLYMERS, Saint-pierre-les-nemours (FR)

(72) Inventors: Steven Van Zutphen, Bouron Marlotte (FR); Vladica Bocokic, Nemours (FR)

(73) Assignee: MAGPIE POLYMERS, Saint-Pierre-les-Nemours (FR)

(*) Notice: Subject to any disclaimer, the term of this patent is extended or adjusted under 35 U.S.C. 154(b) by 329 days.

(21) Appl. No.: 14/428,882

(22) PCT Filed: Sep. 17, 2012

(86) PCT No.: PCT/IB2012/054916
§ 371 (c)(1),
(2) Date: Mar. 17, 2015

(87) PCT Pub. No.: WO2014/041405
PCT Pub. Date: Mar. 20, 2014

(65) Prior Publication Data
US 2015/0203387 A1    Jul. 23, 2015

(51) Int. Cl.
C02F 1/62      (2006.01)
C02F 1/28      (2006.01)
C02F 1/58      (2006.01)
C02F 1/68      (2006.01)
C08J 9/36      (2006.01)
C02F 101/00    (2006.01)
C02F 101/20    (2006.01)

(52) U.S. Cl.
CPC ............... *C02F 1/62* (2013.01); *C02F 1/285* (2013.01); *C02F 1/58* (2013.01); *C02F 1/683* (2013.01); *C08J 9/36* (2013.01); *C02F 2101/006* (2013.01); *C02F 2101/20* (2013.01); *C08J 2325/06* (2013.01)

(58) Field of Classification Search
None
See application file for complete search history.

(56) References Cited

U.S. PATENT DOCUMENTS 4,157,313 A     6/1979   Conan et al.

FOREIGN PATENT DOCUMENTS

EP     2 230 244 A1    9/2010

OTHER PUBLICATIONS

May 27, 2013 Written Opinion of the International Searching Authority issued in International Application No. PCT/IB2012/054916.
Addison, Simon James, "The Functionalisation of Wool by Tris(Hydroxymethyl)Phosphine for Metal Ion Recovery," Thesis, The University of Waikato, 2009.
May 27, 2013 International Search Report issued in International Application No. PCT/IB2012/054916.

*Primary Examiner* — Chester Barry
(74) *Attorney, Agent, or Firm* — Oliff PLC

(57) ABSTRACT

The invention relates to a method for preparing phosphine-based selective transition metal binding particles, said method comprising at least a step of reacting macroporous particles comprising at least one "NH" reactive function reacted with at least one molar equivalent of a phosphine derivative R—P(CH$_2$OH)$_2$, with a nucleophile reactive agent of formula NHR$^a$R$^b$, wherein NHR$^a$R$^b$ comprises at least one "NH" function.

19 Claims, 4 Drawing Sheets

PHOSPHINE-BASED METAL BINDING PARTICLES AND METHODS FOR PREPARING AND USING

Figure 1:
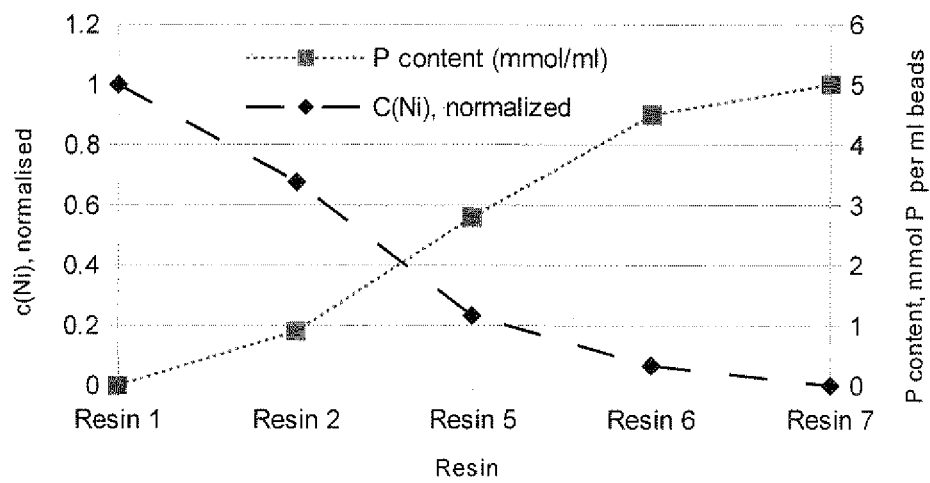

The instant invention relates to phosphine-based transition metal binding particles, a method of preparation of these particles, as well as their use for binding transition metal atoms from an aqueous medium.

More specifically, the invention relates to a novel method for preparing phosphine-based transition metal binding particles enabling the selectivity of those particles towards specific subsets of transition metal to be easily and finely tuned.

Metal binding particles find an increasing use for the removal of metal from metal containing waste streams. The aim is to clean-up the waste, to recycle the water and to recover the (valuable) metals. The purpose can therefore be ecological, economical or both.

Metal binding particles can be added to a metal containing stream as flocculant or coagulant. Alternatively the water can be filtered through a column of metal binding particles. Particle size, shape, stability and wetting properties are of pivotal importance for the particles to be efficient in a specific application. In particular for a filtration application size and shape will determine the pressure-drop across the column and the use-ability and useful life-time of the system. Another important parameter is the amount of metal that can be charged onto a volume of metal binding particles. This will affect the operating life-time and the size of the system.

Metal binding particles are generally applied to particle-free water and target dissolved metals, i.e. metal ions and dissolved metal complexes.

Numerous materials have been developed to this end, either from natural origin such as chitosan, activated charcoal or cellulose, or from synthetic origin such as polyacrylic acid or chelating ion-exchange resins. Differentiators between these materials are cost and availability but also importantly metal binding strength, capacity and selectivity.

The more generic materials bind a large range of metals, including alkaline, alkaline earth and transition metals, but also organic fragments, halogens and inorganic anions. The more specific materials will target metals only, or even a specific group or family of metals.

To date, the large majority of specific metal binding particles use either physical absorption principles or mechanism of ion-exchange to bind the metals. As a result, selectivity will be largely based on charge: hence $M^{2+}$ may be separated from $M^{3+}$ ions, but the systems will have difficulty to distinguish between different $M^{2+}$ ions.

Phosphine-based metal binding materials on the other hand use coordination chemistry to bind dissolved metal species and to effectively remove them from solution. These materials provide a unique selectivity and metal binding strength.

Unlike materials based on ion-exchange principles, the phosphine-based materials do not bind metals via coulombic (electrostatic) interactions, but via coordinative binding of the metals to the resin. In fact, the metal binding particles behave as Lewis-base, while the metals captured behave as Lewis-acids. This type of interaction is reserved predominantly to transition metals. These materials therefore bind transition metals, irrespective of the presence of alkaline and alkaline earth metals, as well as of organic fragments and inorganic anions.

Triphenyl phosphine based resins belong to this type of materials, but their preparation requires the use of P—Cl containing compounds which are toxic and difficult to handle. The resultant resins bearing triphenyl phosphines are relatively unstable under ambient conditions and prone to oxidation.

Phosphines, phosphine oxides, phosphine sulphides, phosphine selenides, phosphine tellurides or iminophosphoranes are used in a great diversity of ligands capable to stabilize transition metal atoms. These functional groups have also been incorporated in polymeric materials, through the functionalization of polysiloxane, polystyrene or polyethylene glycol type polymers.

For example, tris(hydroxymethyl)phosphine (THP) grafted on a silica-polysiloxane support (U.S. Pat. No. 4,157,313) were used for complexing metal atoms.

However, these polymeric materials have, usually, a low amount of phosphine loading.

Phosphine functionalized natural materials, such as wool, have been investigated by Addison ("The functionalisation of wool by tris(hydroxymethyl)phosphine for metal ion recovery", Thesis, University of Waikato, 2009). Using this method only between 1 and 2 wt % phosphorus was grafted onto the carrier material. The resulting material is not suitable for industrial application due to the instability and batch variability of wool, the lack of control over the particle size and the low metal binding capacity that can be achieved on such a support. No selectivity between metals has been demonstrated for these materials.

Polymeric compounds prepared from tris(hydroxymethyl)phosphine (THP) as a starting material have been proposed in EP 2 230 244. These compounds have a high loading of phosphine groups compared to the mass of the polymer. However, the loading is not well controllable and due to the particle size and shape, the polymeric compounds are unsuitable for applications in industrial processes such as filtration at high flow rates leading to formation of a dense filtration cake resulting in high pressure-drops.

Thus, there is a need for transition metal binding particles made of polymers with particularly good metal binding strength, capacity, kinetics and selectivity.

There is also a need for a simple and fast method for preparing such transition metal binding particles from low-cost, easy to handle and readily available starting materials and reagents.

There is also a need for a method for preparing such transition metal binding particles allowing the selectivity of those particles towards specific subset of transition metal to be easily and finely adjusted.

A particular need exits for such particles as mentioned above, which are suitable for industrial application, notably for filtration processes and for water purification.

The present invention has for purpose to meet these needs.

According to a first embodiment, the present invention relates to a method for preparing phosphine-based selective transition metal binding particles, said method comprising at least a step of:

reacting macroporous particles comprising at least one "NH" reactive function reacted with at least one molar equivalent of R—P(CH$_2$OH)$_2$, in which R is selected from the group consisting of

—CH$_2$OH;

linear, branched, or cyclic (C$_1$-C$_{25}$)alkyl groups, optionally substituted with one or more of the following substituents:

—C(O)OH,

—C(O)H,

—C(O)R$^1$,

—C(O)OR$^1$,

—NR$^1$R$^2$,
—C(O)SR$^1$,
in which R$^1$ and R$^2$ are, independently of each other, selected in the group consisting of linear, branched, and cyclic (C$_1$-C$_{10}$)alkyl groups;
C$_5$-C$_6$ aryl groups; and
a benzyl group, optionally substituted with one or more substituents selected from the group consisting of linear, branched, or cyclic (C$_1$-C$_{25}$)alkyl or (C$_1$-C$_3$)alkoxy groups, —C(O)OH, —C(O)H, —C(O)R$^1$, —C(O)OR$^1$, —NR$^1$R$^2$, NO$_2$, and —C(O)SR$^1$;
with
a nucleophile reactive agent of formula NHR$^a$R$^b$, wherein R$^a$ and R$^b$ are, independently of each other, selected from the group consisting of:
—H;
linear, branched, or cyclic (C$_1$-C$_{25}$)alkyl groups, optionally substituted with at least one moiety selected from the group consisting of —NH$_2$, —C(O)OH, —OH, —C(O)NH$_2$, —SR$^c$ in which R$^c$ is H or CH$_3$, a saturated, unsaturated or aromatic hydrocarbon-based 5 to 9 membered-mono- or bi-cycle comprising optionally at least one heteroatom chosen from N, O or S;
—C(O)R$^d$ or C(S)R$^d$ with R$^d$ being NH$_2$ or a linear, branched or cyclic C$_1$-C$_{25}$ alkyl optionally substituted with at least one —NH$_2$ moiety;

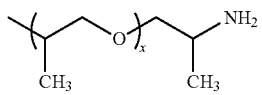

with x ranging from 2 to 70;

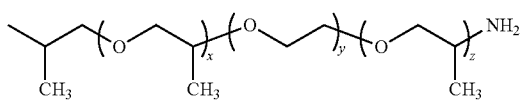

with y ranging from 2 to 40 and x+z ranging from 1 to 6;

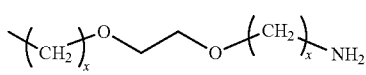

with x being 2 or 3;

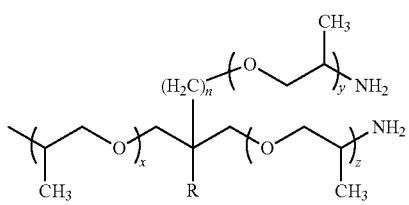

with R being H or Et, n being 0 or 1 and x+y+z ranging from 5 to 90;
with the proviso that NHR$^a$R$^b$ comprises at least one "NH" function.

Unexpectedly, the inventors have determined that a method for preparing transition metal binding particles according to the present invention allows controlling essential parameters of the obtained particles, namely metal binding strength, capacity, kinetics and selectivity, by multiple means. Indeed, the sequential modification of a) phosphine particles obtained from the reaction of amine-functionalized type particles reacted with phosphine-based compounds R—P(CH$_2$OH)$_2$ with b) amine-based compounds, optionally involving subsequent reaction of the obtained particles in a sequential manner with phosphine-based compounds R—P(CH$_2$OH)$_2$ and amine-base compounds, provides a simple way to finely adjust the selectivity of those particles towards transition metal.

As illustrated by the examples, the particles obtained by the methods of the invention show very good metal capturing properties. The various particles obtained differ in terms of chemical/physical nature of the support particle such as core material, size and shape, as well as in method-dependent properties such as phosphine content, functional end groups, phosphine functionality, "layer" structure, and it has been demonstrated in the examples that these characteristics are i) well controllable and ii) have considerable influences on the metal capturing properties, which may be adjusted by controlling the aforementioned characteristics. These properties are obtainable and adjustable due to/owing to the sequential implementation of the method of the invention and the use of, as starting material, amine-functionalized type particles comprising a single unit of phosphine grafted per amine function.

Firstly, the amount of phosphine groups grafted directly relates to the amount of metal that can be charged onto the particles. The metal binding capacity of the resulting particle can therefore be well controlled by the surface area of the starting material, by the amount of reaction sites on the surface, and also by the number of iteration of the sequence of reaction steps.

The metal binding strength, as well as the selectivity for certain metal groups have been shown to be influenced by the introduction of certain end groups and by the modification of the phosphine functionality, e.g. by oxidation and/or sulphurisation.

It has been demonstrated that the phosphorus content as well as different phosphine functionalities have an impact on the metal capture kinetics.

All these aspects may be adjusted and modulated by the sequential implementation of the method of synthesis of the phosphine-based selective transition metal binding particles.

The performance of the particles obtained has been shown to be pH-dependent and it has been found that the particles are particularly suitable for metal capturing in acidic media.

Lastly, it has been found unexpectedly that adjusting the number of iteration has a significant influence on the selectivity of the particles.

A "phosphine-based" particle refers to a particle comprising phosphine, phosphine oxide and/or phosphine sulphide groups. These groups are particularly interesting with respect to their reactivity towards metal and thus for metal-binding. The term "selective" describes the ability of particles prepared by the methods of the invention to bind specifically a subset of transition metal atoms over the whole group of metal transition atoms, and result from a particular affinity of the particles towards this subset.

Within the invention, an "NH" reactive function is intended to refer to all functional groups containing at least one nitrogen-hydrogen bond, and having a nucleophilic character allowing it to react with a bis(hydroxymethyl) phosphine derivative.

A "nucleophilic reactive agent" refers to a reagent capable to react as a nucleophile in a chemical reaction showing reactivity towards an electrophile.

According to another of its objects, the present invention relates to a use of macroporous particles comprising at least one "NH" reactive function reacted with at least one R—P(CH$_2$OH)$_2$, in which R is as previously, or thereafter, defined as a reactive agent in a method for preparing phosphine-based transition metal binding particles with oriented selectivity.

The expression "oriented selectivity" refers to a property of the particles of the invention to specifically bind, with a particular affinity, a subset of transition metal atoms over the whole group of metal transition atoms. "Oriented" means that this property is imparted to the particles through the particular choice of reactive agents and steps implemented in the method of the invention for preparing these particles.

According to another of its objects, the present invention relates to phosphine-based metal binding particles obtainable by the method of the invention.

According to another of its objects, the present invention relates to a use of phosphine-based metal binding particles of the invention, for binding transition metal atoms from an aqueous medium, said transition metal atoms selected from the group consisting of: Sc, Ti, V, Cr, Mn, Fe, Co, Ni, Cu, Zn, Ga, Ge, As, Se, Y, Zr, Nb, Mo, Tc, Ru, Rh, Pd, Ag, Cd, In, Sn, Sb, La, Hf, Ta, W, Re, Os, Ir, Pt, Au, Hg, Tl, Pb, Bi, Ce, Pr, Nd, Pm, Sm, Eu, Gd, Tb, Dy, Ho, Er, Tm, Yb, Lu, Ac, Th, Pa, U, Np, Pu.

Within the meaning of the invention, "metal atoms" refer to metal atoms in the usual meaning known to a man skilled in the art, including ions, complexed ions and metal atoms in neutral metal complexes.

According to another of its objects, the present invention relates to a method for capturing transition metal atoms from an aqueous medium, said method comprising at least the steps consisting of:

contacting phosphine-based metal binding particles of the invention with an aqueous medium presumed to contain said transition metal atoms to be captured, in conditions suitable for said capture to occur, and removing the phosphine-based metal binding particles from said aqueous medium by separating the particles from the aqueous medium.

FIG. 1: shows the concentration of remaining Ni(II) ions in an aqueous medium after metal capturing with resins 1, 2 and 5 to 7, having increasing phosphorus content.

Figure 2:
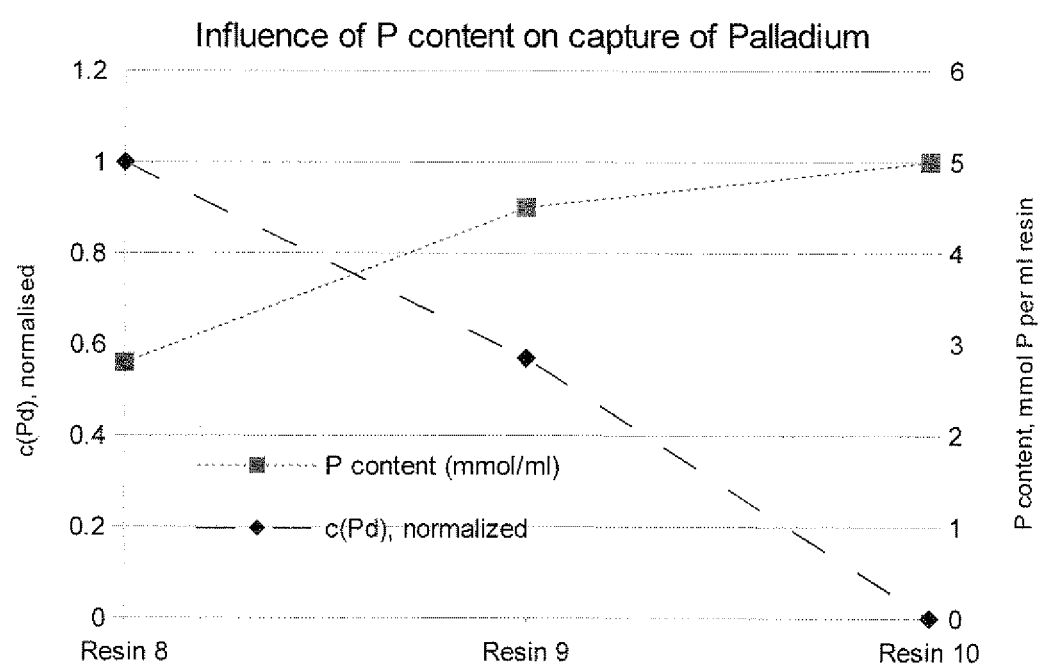

FIG. 2: shows the normalised concentration of remaining Pd(II) ions in an aqueous medium after metal capturing with resins 8 to 10 having increasing phosphorus content.

Figure 3:
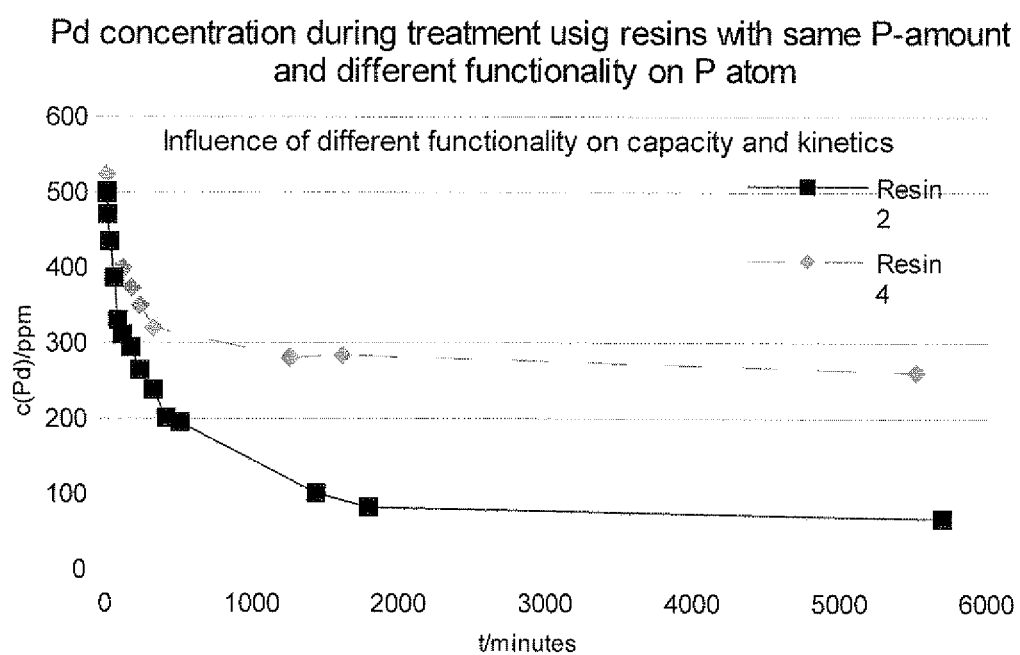

FIG. 3: shows the concentration of remaining Pd(II) ions in an aqueous medium over time after metal capturing with resins 2 and 4 having different phosphine functionality (resin 2: phosphine; resin 4: phosphine-oxide).

Figure 4:
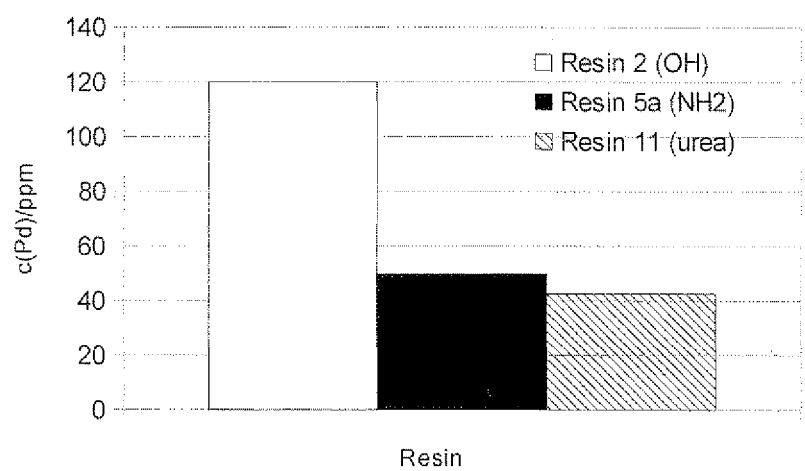

FIG. 4: shows the concentration of remaining Pd(II) ions in an medium after metal capturing with particles of resins 2, 5a and 11 having different end groups (resin 2: phosphine; resin 5a: ammonia-modified phosphine; resin 11: urea-modified phosphine).

MACROPOROUS PARTICLES

Macroporous particles suitable for the invention may be cross-linked organic polymer particles. Preferably the organic polymer may be selected from the group consisting of polystyrene, polyamide, polyethylene, poly(acrylate), poly(ethyleneglycol) as well as their copolymers, and preferably the macroporous particles are polystyrene particles.

"Polymer" or "polymeric" refer to a material that is a homopolymer or copolymer. As used herein, the term "homopolymer" refers to a polymeric material prepared using one monomer. As used herein, the term "copolymer" refers to a polymeric material that is prepared using two or more different monomers.

Macroporous particles suitable for the invention comprise at least one "NH" reactive function.

Typically, primary or secondary amines, acid amides, thio amides, urea and thiourea derivatives comprise "NH" reactive functions within the meaning of the invention. In particular a primary amine —NH$_2$ may be considered as comprising two "NH" reactive functions.

In a preferred embodiment, the "NH" reactive functions are given by primary and/or secondary amines.

Within the invention, the term "macroporous" is intended to refer to a porous structure of the particles which is permanent, that is to say even in dry state, in contrast to gel-type resins which must be swollen to gain access to the interior part of the particles.

Particles suitable for the invention may present a pore diameter of d at least 0.05 micrometer, and preferably 0.1-1 micrometer as measured by mercury intrusion porosimetry or nitrogen adsorption porosimetry.

The shape and size of the particles are selected to make them very suitable for transport/transfer (good pourability), as well as for setting up and controlling the process parameters, i.e. the pressure drop, flow rate, column dimensioning, etc. in filtration (packed or fluidized) beds.

Macroporous particles suitable for the invention may be of any form, such as oblong, oblate, flattened, spherical, egg-shaped, oval, and preferably are spherical.

The term "spherical" is used to characterise particles having a certain degree of sphericity $\Psi$, where $\Psi$ is defined as the ratio of the surface area of a sphere having the same volume $V_p$ as the particle, and the surface area $A_p$ of the particle: $\Psi=(\pi^{1/3}(6V_p)^{2/3})/A_p$ In a particular embodiment, particles of the invention may have a sphericity ranging from 0.5 to 1.

Preferably, the particles suitable for the invention may present a sphericity ranging from 0.85 to 1 and most preferably from 0.9 to 1.

The size of the particles used as starting material in the methods of the present invention is preferably in the range from 0.1 to 10.0 mm and more preferably from 0.5 to 1.0 mm as measured using calibrated sieves of appropriate mesh sizes.

According to one preferred embodiment, macroporous particles suitable for the invention may be polystyrene macroporous particles comprising "NH" reactive functions as above-defined. Preferably, macroporous particles suitable for the invention may be polystyrene macroporous particles functionalized with a (C$_1$-C$_3$)alkylene diamine, and preferably with an ethylene diamine.

Macroporous particles suitable for the invention comprise at least one "NH" reactive function reacted with at least one molar equivalent (referring to one phosphine-containing molecule per "NH" reactive function present in the particle) of a bis(hydroxymethyl) phosphine derivative R—P(CH$_2$OH)$_2$.

Phosphine Derivatives

Phosphine derivatives suitable for the invention are of following formula R—P(CH$_2$OH)$_2$.

The substituent R is preferably chosen from the group consisting of:
- —CH$_2$OH;
- linear, branched, or cyclic (C$_1$-C$_{25}$)alkyl groups, optionally substituted with one or more of the following substituents:
  - —C(O)OH,
  - —C(O)H,
  - —C(O)R$^1$,
  - —C(O)OR$^1$,
  - —NR$^1$R$^2$,
  - —C(O)SR$^1$,
  - in which R$^1$ and R$^2$ are, independently of each other, selected in the group consisting of linear, branched, and cyclic (C$_1$-C$_{10}$)alkyl groups;
- C$_5$-C$_6$ aryl groups; and
- a benzyl group, optionally substituted with one or more substituents selected from the group consisting of linear, branched, or cyclic (C$_1$-C$_{25}$)alkyl or (C$_1$-C$_3$)alkoxy groups, —C(O)OH, —C(O)H, —C(O)R$^1$, —C(O)OR$^1$, —NR$^1$R$^2$, NO$_2$, and —C(O)SR$^1$;

In one preferred embodiment, R may be selected from the group consisting of: CH$_2$OH; a linear, branched, or cyclic (C$_2$-C$_{20}$)alkyl, optionally substituted as above-indicated; a C$_6$ aryl group; and a benzyl group.

In another embodiment, when R may represent a linear, branched, or cyclic (C$_1$-C$_{25}$)alkyl groups, optionally substituted as above-indicated, it may further preferably be a linear, branched, or cyclic (C$_2$-C$_{20}$)alkyl, preferably (C$_3$-C$_{16}$)alkyl, more preferably (C$_4$-C$_{12}$), more preferably (C$_5$-C$_{10}$)alkyl, and more preferably (C$_6$-C$_8$)alkyl group, optionally substituted as above-indicated.

In another preferred embodiment, when R may represent a linear, branched, or cyclic (C$_1$-C$_{25}$)alkyl groups, optionally substituted as above-indicated, it may further preferably be a linear, branched, or cyclic (C$_1$-C$_6$)alkyl, preferably (C$_2$-C$_5$)alkyl, preferably (C$_3$-C$_4$)alkyl group optionally substituted as above-indicated.

A linear, branched, or cyclic alkyl group as above-defined may preferably be not substituted or substituted with one or more of the following substituents:
- —C(O)OH,
- —C(O)H,
- —C(O)R$^1$,
- —C(O)OR$^1$,
- —NR$^1$R$^2$,
- —C(O)SR$^1$,
in which R$^1$ and R$^2$ are, independently of each other, selected in the group consisting of linear, branched, and cyclic (C$_1$-C$_{10}$)alkyl groups.

In another preferred embodiment, a linear, branched, or cyclic alkyl group as above-defined may preferably be optionally substituted with one or more of the following substituents:
- —C(O)OH,
- —C(O)H,
- —C(O)R$^1$,
- —C(O)OR$^1$,
- —NR$^1$R$^2$,
- —C(O)SR$^1$,
in which R$^1$ and R$^2$ are, independently of each other, selected in the group consisting of linear, branched, and cyclic (C$_1$-C$_6$)alkyl, preferably (C$_2$-C$_5$)alkyl, preferably (C$_3$-C$_4$)alkyl groups.

Preferably again, a linear branched, or cyclic alkyl group as above-defined may be optionally substituted.

In a particular embodiment, R may be selected in a way so that R or the resulting phosphine after reaction may or may not be chiral.

In another preferred embodiment, R may be selected from the group consisting of: CH$_2$OH; a linear, branched, or cyclic (C$_1$-C$_6$)alkyl, optionally substituted as above-indicated; a phenyl group; and a benzyl group.

In another preferred embodiment, R may be CH$_2$OH.

As above-indicated, the starting raw material for a method of the invention is macroporous particles as above-defined having reacted with a phosphine derivative as above defined, and is also called phosphine-modified macroporous particles.

The phosphine-modified macroporous particles suitable for the invention comprising "NH" reactive functions are reacted with at least one molar equivalent of a bis(hydroxymethyl) phosphine derivative R—P(CH$_2$OH)$_2$.

The molar equivalent of a bis(hydroxymethyl) phosphine derivative R—P(CH$_2$OH)$_2$ is adjusted according to the amine-end functions of the macroporous particles so as to allow the reaction of one molecule R—P(CH$_2$OH)$_2$ per "NH" function.

In a preferred embodiment, the molar equivalent of a bis(hydroxymethyl) phosphine derivative R—P(CH$_2$OH)$_2$ is between 1 and 2 and more preferably between 1.0 and 1.5.

Thus, the surface of the spherical macroporous particles used as a starting material is functionalized with a "layer" of single phosphine-containing end units as a result of a nucleophilic substitution reaction between the "NH" reactive functions of the macroporous particles and the hydroxymethyl moieties of the R—P(CH$_2$OH)$_2$ molecules.

The reaction may be performed according to any known methods in the art.

According to a preferred embodiment, macroporous particles suitable for the invention may be polystyrene macroporous particles functionalized with a (C$_1$-C$_3$)alkylene diamine, and preferably, phosphine-modified macroporous particles may be polystyrene macroporous particles functionalized with an ethylene diamine having been reacted with tris(hydroxymethyl)phosphine (THP).

THP may be obtained according to any known method in the art, and in particular by neutralization of tetrakis(hydroxymethyl)phosphonium sulfate (THPS) or tetrakis(hydroxymethyl)phosphonium chloride, [P(CH$_2$OH)$_4$]Cl (THPC) with a base, such as sodium hydroxide, ammonia or an organic base such as triethylamine, and preferably sodium hydroxide.

The phosphine-modified macroporous particles thus obtained may comprise a total amount of phosphorus on the particles of at least 0.5 mmol/ml particles, preferably of at least 0.7 mmol/ml particles, and preferably of at least 0.9 mmol/ml particles, where the particles are of a density close to 1.

An advantage of using macroporous particles comprising "NH" reactive functions reacted with at least one molar equivalent of R—P(CH$_2$OH)$_2$ molecules, or phosphine-modified macroporous particles, as starting raw material for the method of the invention is that it allows controlling finely the functionalization by phosphine units of the extremities of the polymer constituting the macroporous particles.

These phosphine-modified macroporous particles comprise free hydroxyl groups from the phosphine units and may thereafter be easily and finely modified within the sequential method of the invention to adjust the affinity of the macroporous particles towards transition metal atoms, and in particular towards subset of transition metal atoms.

The affinity of the macroporous particles with phosphine-modified polymers extremities towards subset of transition metal atoms may be adjusted through further sequential and iterative reactions with nucleophile reactive agents and R—P(CH$_2$OH)$_2$ molecules as above-defined.

Nucleophile Reactive Agents

Nucleophile reactive agents suitable for the invention are of formula NHR$^a$R$^b$, in which R$^a$ and R$^b$ are, independently of each other, selected from the group consisting of:
—H;
linear, branched, or cyclic (C$_1$-C$_{25}$)alkyl groups, optionally substituted with at least one moiety selected from the group consisting of —NH$_2$, —C(O)OH, —OH, —C(O)NH$_2$, —SR$^c$ in which R$^c$ is H or CH$_3$, a saturated, unsaturated or aromatic hydrocarbon-based 5 to 9 membered-mono- or bi-cycle comprising optionally at least one heteroatom chosen from N, O or S;
—C(O)R$^d$ or C(S)R$^d$ with R$^d$ being NH$_2$ or a linear, branched or cyclic C$_1$-C$_{25}$ alkyl optionally substituted with at least one —NH$_2$ moiety;

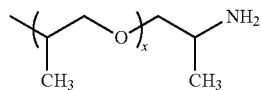

with x ranging from 2 to 70;

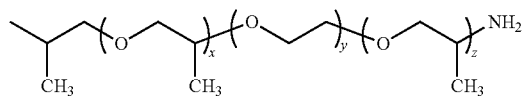

with y ranging from 2 to 40 and x+z ranging from 1 to 6;

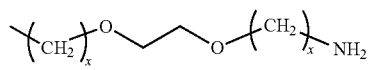

with x being 2 or 3;

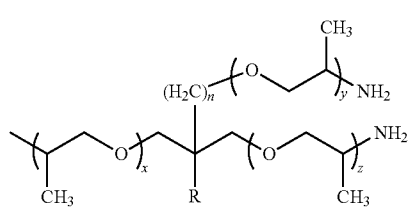

with R being H or Et, n being 0 or 1 and x+y+z ranging from 5 to 90;
with the proviso that NHR$^a$R$^b$ comprises at least one "NH" function.

In one embodiment, R$^a$ may represent H and R$^b$ may represent a linear, branched, or cyclic (C$_1$-C$_{25}$)alkyl, preferably a (C$_1$-C$_{20}$)alkyl, preferably again a (C$_1$-C$_{16}$)alkyl, more preferably a (C$_1$-C$_{10}$)alkyl, even more preferably a (C$_1$-C$_6$)alkyl group, optionally substituted with at least one moiety selected from the group consisting of —NH$_2$, —C(O)OH, —OH, —C(O)NH$_2$, —SR$^c$ in which R$^c$ is H or CH$_3$, a saturated, unsaturated or aromatic hydrocarbon-based 5 to 9 membered-mono- or bi-cycle comprising optionally at least one heteroatom chosen from N, O or S.

In one embodiment, one of R$^a$ and R$^b$ may represent a linear, branched, or cyclic (C$_1$-C$_6$)alkyl, preferably a (C$_2$-C$_5$)alkyl, preferably again a (C$_3$-C$_4$)alkyl group, optionally substituted with at least one moiety selected from the group consisting of —NH$_2$, —C(O)OH, —OH, —C(O)NH$_2$, —SR$^c$ in which R$^c$ is H or CH$_3$, a saturated, unsaturated or aromatic hydrocarbon-based 5 to 9 membered-mono- or bi-cycle comprising optionally at least one heteroatom chosen from N, O or S.

In another embodiment, a linear, branched, or cyclic alkyl group as above defined may be substituted with at least one —C(O)OH moiety and optionally with at least one moiety selected from the group consisting of —NH$_2$, —C(O)OH, —OH, —C(O)NH$_2$, —SR$^c$ in which R$^c$ is H or CH$_3$, a saturated, unsaturated or aromatic hydrocarbon-based 5 to 9 membered-mono- or bi-cycle comprising optionally at least one heteroatom chosen from N, O or S.

In one embodiment, a nucleophile reactive agent suitable for the invention may be an amino acid.

In one embodiment, one of R$^a$ and R$^b$ may represent H and the other one may be selected from the group consisting of:
—H;
linear, branched, or cyclic (C$_1$-C$_6$)alkyl groups, optionally substituted with at least one moiety selected from the group consisting of —NH$_2$, —C(O)OH, —OH, —C(O)NH$_2$, —SR$^c$ in which R$^c$ is H or CH$_3$, a saturated, unsaturated or aromatic hydrocarbon-based 5 to 9 membered-mono- or bi-cycle comprising optionally at least one heteroatom chosen from N, O or S;
—C(O)R$^d$ or C(S)R$^d$ with R$^d$ being NH$_2$ or a linear, branched or cyclic C$_1$-C$_{25}$ alkyl optionally substituted with at least one —NH$_2$ moiety;

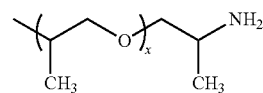

with x ranging from 2 to 70;

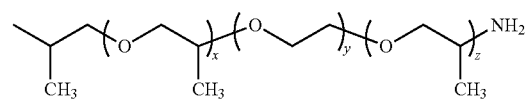

with y ranging from 2 to 40 and x+z ranging from 1 to 6;

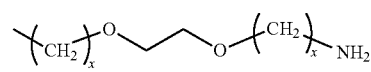

with x being 2 or 3;

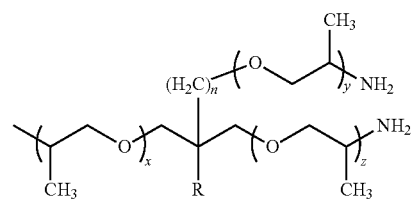

with R being H or Et, n being 0 or 1 and x+y+z ranging from 5 to 90.

According to another embodiment, one of $R^a$ and $R^b$ may represent H and the other one may be selected from the group consisting of:

—H;

linear, branched, or cyclic $(C_1-C_6)$alkyl groups substituted with at least one moiety selected from the group consisting of —$NH_2$, —C(O)OH, —OH, —C(O)$NH_2$; —C(O)$R^d$ or C(S)$R^d$ with $R^d$ being $NH_2$ or a linear, branched or cyclic $C_1-C_{25}$(alkyl), preferably a $(C_1-C_{20})$ alkyl, preferably again a $(C_1-C_{16})$alkyl, more preferably a $(C_1-C_{10})$alkyl, even more preferably a $(C_1-C_6)$ alkyl, preferably a $(C_2-C_5)$alkyl, preferably again a $(C_3-C_4)$alkyl group optionally substituted with at least one —$NH_2$ moiety.

According to another embodiment, one of $R^a$ and $R^b$ may represent H and the other one may be selected from the group consisting of:

—H;

linear, branched, or cyclic $(C_1-C_6)$alkyl, preferably a $(C_2-C_5)$alkyl, preferably again a $(C_3-C_4)$alkyl groups substituted with at least one, preferably two —$NH_2$ groups;

—C(O)$R^d$ with $R^d$ being $NH_2$.

According to another embodiment, both $R^a$ and $R^b$ are selected from the group consisting of linear, branched, or cyclic $(C_1-C_6)$alkyl, preferably a $(C_2-C_5)$alkyl, preferably again a $(C_3-C_4)$alkyl groups, each being substituted with at least one to two-$NH_2$ groups, preferably one —$NH_2$ group;

More preferably, one of $R^a$ and $R^b$ represents H and the other one is selected from any group of substituents for $R^a$ and $R^b$ as defined above so that $NHR^aR^b$ is chosen from the group comprising amino acids, ureas, thioureas, ammonia and terminal alkylene diamines.

Preparation of Phosphine-Based Selective Transition Metal Binding Particles

As above-indicated, the phosphine-modified macroporous particles used as starting material for the method of the invention contain free hydroxyl end groups (from the phosphine units), which are susceptible to subsequent nucleophilic substitution reactions.

The method according to the invention for preparing phosphine-based transition metal binding particles involves at least a first step of: reacting the phosphine-modified macroporous particles described above with at least one nucleophile reactive agents of the type $NHR^aR^b$, as described above. The OH groups of phosphine units grafted onto the macroporous particles react with amines according to a Mannich-type condensation reaction (Tetrahedron, 46, 1791, 1990).

As indicated above the nucleophile reactive agent $NHR^aR^b$ to be used within the invention contains at least one "NH" function and in particular may contain two "NH" functions.

The reaction between phosphine-modified macroporous particles and the nucleophile reactive agent $NHR^aR^b$ is preferably performed with at least one molar equivalent of "NH" functions relative to the free hydroxyl end groups of the phosphine-modified macroporous particles.

The metal binding particles obtained after this first reaction step exhibit free "NH" reactive functions as end groups, which may be further reacted with at least one molar equivalent of bis(hydroxymethyl) phosphine derivative R—P(CH$_2$OH)$_2$ in a second step, if the $NHR^aR^b$ reagent contained at least two "NH" functions.

Thus, according to one embodiment, the method of the invention may comprise an additional subsequent reaction step (second reaction step) consisting of reacting the previously obtained phosphine-based selective transition metal binding particles with a mole equivalent of R—P(CH$_2$OH)$_2$ as defined previously, if the $NHR^aR^b$ reagent contained at least two "NH" functions.

The first and second reaction step together form a sequence of steps.

Schematically spoken through the different stages of the method of the invention, one may observe that if the phosphine-modified macroporous particles used as a starting material had one outer phosphine-containing layer, then the phosphine-based selective transition metal binding particles obtained after the first reaction step have one inner phosphine-containing layer and an outer "NH" reactive function-containing layer, and the phosphine-based selective transition metal binding particles obtained after the second reaction step have one inner and one outer phosphine-containing layer, as well as one intermediate "N" function-containing layer. Though the reaction is believed to be carried out relatively uniformly, this explanation is of course meant to be neither interpreted literally nor limiting. Moieties belonging to a "layer" of same nature will mostly not be interconnected while two adjacent "layers" will be connected by a plurality of covalent bonds between moieties belonging to one and the other "layer".

The method according to the invention may furthermore be extended to a series of reaction steps by iterating the above mentioned sequence of steps so as to obtain multi-layered particles wherein the layers contain alternatingly phosphine or "NH" reactive functions.

Thus, according to another preferred embodiment, a method of the invention may comprise an additional subsequent sequence of steps consisting of:

reacting said phosphine-based selective metal binding particles with a nucleophile reactive agent of formula $NHR^aR^b$ as defined above, wherein $NHR^aR^b$ comprises at least two "NH" functions, further reacting said phosphine-based selective metal binding particles with a mole equivalent of R—P(CH$_2$OH)$_2$ as defined above.

This additional sequence of steps may be iterated for a number of times ranging from 0 to 10, preferably for a number of times ranging from 0 to 8, preferably for a number of times ranging from 1 to 6, and more preferably for a number of times ranging from 2 to 4. Also, this additional sequence of steps may be iterated 1, 2, 3, 4, 5 or 6 times.

A man skilled in the art is able to adapt the solvent and temperature conditions to be used within the methods of the invention according to the nature of the phosphine-modified macroporous particles, the nucleophile reactive agent $NHR^aR^b$, and the R—P(CH$_2$OH)$_2$ molecules. These adaptations are routine work for a skilled man, and need not to be more detailed here. For example, a method of the invention may be performed in water at room temperature. Other suitable solvents may be, for example, acetone, toluene, organic ethers, organic esters, halogenated solvents or any non-nucleophilic polar or non-polar solvent.

Phosphine-based selective metal binding particles in accordance with the invention may contain at least of at least 2 mmol/ml particles, preferably of at least of at least 2.5 mmol/ml particles, preferably of at least 3 mmol/ml particles, preferably of at least 4 mmol/ml particles, and more preferably of at least 5 mmol/ml particles.

A method of the invention may further comprise additional steps consisting in oxidizing or sulfurizing phosphorus atoms.

In another embodiment, a method of the invention may comprise an additional step consisting of: reacting the phosphine-based selective metal binding particles with a sulfurization reagent. Such agent may, in particular, be selected from the group consisting of elemental sulfur such as S8, polythiosulphate, or (poly)sulfide ions. The sulfurization reaction may advantageously be performed in a solvent suitable for swelling the particles and solubilizing the sulfurization reagent.

A "solvent" in the meaning of the present invention is a chemical compound or a mixture of compounds, liquid at ambient conditions, i.e. 25° C. and 1 bar.

"Swelling" characterises an increase in volume of the particles due to the presence of a suitable solvent.

According to a preferred embodiment, a solvent usable in the step of sulfurizing phosphorus atoms may be selected from the group consisting of water, diethyl ether, tert-butyl methyl ether, tetrahydrofuran, carbon disulfide, depending on the solubility of the sulfur source and the swelling of the polymer, and more preferably is carbon disulfide when using S8 as the sulfur source.

In another embodiment, a method of the invention may comprise an additional step consisting of: reacting the phosphine-based selective metal binding particles with an oxidation agent. An oxidation agent suitable in the invention may be hydrogen peroxide. Hydrogen peroxide may be used at a concentration equal to or lower than 20% (m/m) in water. Preferably, the reaction temperature may be maintained below 20° C.

Use of the Phosphine-Based Selective Transition Metal Binding Particles

As previously indicated the phosphine-based selective transition metal binding particles may advantageously be implemented in methods and uses for binding or capturing transition metal atoms from an aqueous medium.

An "aqueous medium" refers to any composition comprising water as its main component and in which transition metal atoms are presumed to be present.

The transition metal atoms to be bound or captured may be metal atoms selected from the group consisting of: Sc, Ti, V, Cr, Mn, Fe, Co, Ni, Cu, Zn, Ga, Ge, As, Se, Y, Zr, Nb, Mo, Tc, Ru, Rh, Pd, Ag, Cd, In, Sn, Sb, La, Hf, Ta, W, Re, Os, Ir, Pt, Au, Hg, Tl, Pb, Bi, Ce, Pr, Nd, Pm, Sm, Eu, Gd, Tb, Dy, Ho, Er, Tm, Yb, Lu, Ac, Th, Pa, U, Np, and Pu, and preferably metal atoms selected from the group consisting of Ru, Rh, Pd, Re, Os, Ir, Pt, Au, Cd and U.

In a preferred embodiment, the phosphine-based selective transition metal binding particles are phosphine-modified macroporous particles having been reacted once in the sequential sequence with nucleophile reactive agents $NHR^aR^b$ then with $R-P(CH_2OH)_2$ molecules as above-defined and the transition metal atoms to be bound or captured are selected from the group consisting of Ru, Rh, Pd, Re, Os, Ir, Pt, Au, Cd and U.

The pH of the aqueous medium to be put in contact with phosphine-based selective transition metal binding particles in accordance with the invention may be set to any value of pH between 0 and 12. Preferably, the pH value of the aqueous medium set at a value ranging from 0 to 5.

In one embodiment, the invention relates to a use of a compound of the invention for purifying a solution, and in particular an aqueous-solution such as waste-water.

In a preferred embodiment, the phosphine-based selective transition metal binding particles of the invention may be carried out for complexing metal atoms from water.

In one embodiment, a method of the invention may be for purifying a solution, preferably an aqueous medium, presumed comprising metal atoms, and comprises at least the steps consisting of:

introducing phosphine-based selective transition metal binding particles of the invention into a solution presumed comprising metal atoms in conditions suitable for the particles to bind the metal atoms, removing the particles from the solution, for example by centrifuging or filtering, and recovering said solution substantially devoid of metal atoms.

Within the meaning of the invention, "substantially" intends to mean that the solution treated according to the invention does not comprise any longer detectable amount of dissolved metal atoms, as it may be detected with usual methods known in the field.

In numerous applications of the waste treatment type, for example radioactive waste treatment type, there is a need to extract metal entities such metal atoms. For this, particles of the invention may be contacted with a solution comprising such entities. The metal-bound particles obtained is then recovered, for example by filtration or centrifugation, and then heated at a temperature at which the organic species decompose, in order to collect the metal.

Such a process is particularly advantageous in so far as it is very direct and in so far as it makes it possible to treat large amounts of entities to be recycled.

An aspect of the invention relates to a use of phosphine-based selective transition metal binding particles of the invention for recycling metal atoms.

Therefore, a further subject-matter of the invention is a method for recycling metal atoms comprising at least the steps consisting of:

providing a solution comprising metal atoms, introducing in said solution phosphine-based selective transition metal binding particles according to the invention in conditions suitable for the particles to bind the metal atoms, removing said particles having bound metal atoms from the solution, for example by centrifuging or filtering, recovering said metal atoms from said particles, for example by dissolving or carbonising said particles.

According to one embodiment, the recovering step may be carried by heating the solution comprising the particles to a temperature greater than the decomposition temperature of the particles of the invention so as to obtain a mixture of decomposed products.

The recovering of said metal atoms may be further carried by filtration of said mixture of heated and decomposed products.

It is then easy and inexpensive to recover the metal atoms by dissolution or by incinerating the combination at a temperature at which the organic species decompose, also known as "fuming".

An aspect of the invention relates to a use of a compound of the invention for detecting metal atoms.

Therefore, another subject-matter of the invention is a method for detecting a solution presumed comprising metal atoms comprising at least the steps of:

introducing phosphine-based selective transition metal binding particles according to the invention into a solution presumed comprising metal atoms in conditions suitable for the particles to bind the metal atoms, recovering said particles having bound metal atoms from the solution, for example by centrifuging or filtering, and detecting the metal atoms in said particles.

The detecting step may be carried out in situ in said particles or after a step of extracting the metal atoms from said particles. The extracting step may be carried out for example by heating said particles to a temperature greater than the decomposition temperature of the particles of the invention as indicated above.

The step of detecting may be carried out by any techniques known in the art, for example by spectroscopy.

The conditions to carry out the methods and uses of the invention are suitably selected according to routine tasks by a skilled artisan in the art so that bonds are formed between particles of the invention and the metal atoms.

According to one embodiment, the present invention relates to a filtering-device comprising at least one of the particles of the invention. Such filtering-device may be preferably used for water purification.

For example, a compound of the invention may be placed on a filter with a pore size smaller than the size of the particles according to the invention. Water presumed to contain metal atoms can then be flowed through the device allowing the formation of coordination bonds between the phosphine units of the particles of the invention and the metal atoms. Water presumed devoid of selected metal atoms is then recovered at the exit of the filter.

EXAMPLES

Example 1

Synthesis of Particles According to the Invention

Example 1.1

Phosphine-Modified Macroporous Particles

A resin comprising secondary and primary amine containing particles based on an ethylene diamine functionalized polystyrene (resin 1, 1700 ml), is contacted with THP (2.03 mol) prepared by neutralization of THPS (1.02 mol) with NaOH (2.03 mol). After 90 min the resin is filtered off and washed with water to yield resin 2. The ICP analysis of the residual phosphorus content after the reaction showed that 1.60 mol THP were consumed, corresponding to 0.94 mmol P per ml resin beads.

Example 1.2

Ammonia Cross-Linked Phosphine-Based Metal Binding Particles

To resin 2 (500 ml) suspended in 300 ml water ammonia is added (1.12 mol) and stirred for 2.5 hours at room temperature. The resulting resin beads were filtered and washed with water to yield resin 5a. 0.78 mol of ammonia was fixed on the beads, resulting in nominal concentration of 1.56 mmol amino groups per ml beads. To 200 ml of resin 5a suspended in 40 ml water THP (0.81 mol.) prepared by neutralization of THPS (0.405 mol) with NaOH (0.81 mmol). The resin was left to react under stirring for 2 hours, after which it was filtered off and washed with water to yield resin 5. The yield of this reaction was 47% (based on the ICP-analysis of residual P), corresponding to consumption of THP of 0.38 mol and a total amount of phosphorus on the beads of 2.8 mmol/ml beads.

Example 1.3

Ethylenediamine Cross-Linked Phosphine-Based Metal Binding Particles

To resin 2 (300 ml) suspended in 400 ml water, ethylenediamine (0.713 mol, 1.2 equiv.) was added, and after stirring overnight, the resin beads were filtered off and washed with water to yield resin 6a. To 200 ml of this resin suspended in 40 ml water THP was added (1.22 mol, 1.1 equiv.), prepared by neutralization of THPS (0.61 mol) with NaOH (1.22 mol). The resin was left to react for 2 hours, and then it was filtered off and washed with water to yield resin 6. ICP analysis of the residual P revealed a consumption of 0.71 mol THP (88.1 g) and a concentration of phosphorus of 4.5 mmol/ml beads.

Example 1.4

Diethylenetriamine Cross-Linked Phosphine-Based Metal Binding Particles

To resin 2 (300 ml) suspended in 400 ml water diethylenetriamine is added (0.713 mol.) and after stirring overnight, the resin beads were filtered off and washed with water to yield resin 7a. 200 ml of this resin were suspended in 40 ml water and to them THP (1.26 mol) was added, prepared in situ by neutralization of THPS (0.61 mol) with NaOH (1.22 mol). The resin was left to react for 2 hours, and then it was filtered off and washed with water to yield resin 7. The yield of the reaction (64%) was determined by ICP analysis of the residual P and it corresponds to 0.81 mol THP and a concentration of phosphorus of 5.0 mmol/ml beads.

Example 1.5

Introduction of Urea End Groups on the Metal Binding Particles

The resin 2 (10 ml) is contacted with urea ($CO(NH_2)_2$, 0.019 mol) in water overnight. The beads were filtered off and washed with water to yield resin 11.

Example 1.6

Sulphur-Modified Phosphine-Based Metal Binding Particles

The resin 2 is contacted with S8 dissolved in tert-butyl methyl ether (TBME) at reflux for 30 min and washed with acetone to yield resin 3.

Example 1.7

Oxygen-Modified Phosphine-Based Metal Binding Particles

The resin 2, 5, 6 and 7 are contacted in separate reactors with $H_2O_2$ (16%) in water for 30 min and washed with water to yield resin 4, 8, 9 and 10 respectively.

Example 2

Metal Capturing Experiments

Example 2.1

Selectivity of Different Functional Phosphines Towards a Metal

In nine separate flasks, resin 2 (3×1 ml), resin 3 (3×1 ml), and resin 4 (3×1 ml) are contacted with a solution containing Cd(II) (20 ml, 30 mg/l) at pH 2, 3.5 and 5.2 for 2.5 h. The solutions are filtered and the cadmium content of the filtrate is determined by ICP analysis. The cadmium content is reduced by 10%-20% by resin 2 and 4, while resin 3 reduces the cadmium content by around 36% at low pH and around 85% for higher pH levels. This example shows that the chemical functionality of resin 3 has higher affinity and selectivity for cadmium than the functionality of resin 2 or resin 4 (Table 1).

TABLE 1

Comparison % Cd captured using resins 2, 3 & 4

| pH | Resin 2 | Resin 3 | Resin 4 |
| --- | --- | --- | --- |
| 2 | 13.2 | 35.9 | 15.2 |
| 3.5 | 20.5 | 85.3 | 18.0 |
| 5.2 | 16.3 | 86.6 | 17.7 |

Example 2.2

Selectivity of Different Functional Phosphines Towards a Metal

In two separate flasks, resin 2 (1 ml), and resin 3 (1 ml) are contacted with a solution containing Pt(IV) (20 ml, 30 mg/l) at pH 5 for 2.5 h. The solutions are filtered and the platinum content is measured. The platinum content is reduced by 16.3% by resin 2, while resin 3 reduces the platinum content by 86.6%. This example shows that resin 3 has a higher affinity for platinum than resin 2.

Example 2.3

Kinetics and Capacity Differences Due to Different Phosphorus Content

In two separate flasks, resin 2 (0.2 ml), and resin 5 (0.2 ml) are contacted with a solution containing Pd(II) (700 ppm initial concentration, 45 ml) at pH 0.5 and samples are taken at regular time intervals. At 6.5 hours, the remaining Pd amount in the solution contacted with resin 2 is 238 mg/l, while the remaining Pd amount in the solution contacted with resin 5 is 131 ppm. Upon reaching the equilibrium, the final Pd concentrations is 68 ppm for resin 2 and 57 ppm for resin 5. These examples show that:
a) resin 5 has a faster capture kinetics than resin 2, and that
b) the resin 5 with higher P content has a higher saturation capacity for Pd(II) capture.

Example 2.4

Difference in Capture Capacity Related to Phosphorus Content

In five separate flasks, 0.2 ml of resin 1, 2, 5, 6, and 7 are contacted with solution containing Ni(II) (45 ml, 114 ppm Ni, pH=0.5) over 16 hours. The beads are filtered off and the remaining Ni content in the solution is determined by ICP. The results show that the resin containing more phosphorus (5, 6, 7) are more efficient than those containing less (2) or no phosphorus (1) as illustrated in FIG. 1.

Example 2.5

Difference in Capture Capacity Related to Phosphorus Content

In three separate flasks, 0.2 ml of each, resin 8, resin 9, and resin 10, are contacted with a solution containing Pd(II) (114 ppm initial concentration, 45 ml, pH 0.5) for 16 hours. The resins are filtered and the residual Pd content in the solution determined by ICP analysis. These results show that the Pd capture efficiency directly relates to the P content fixed on the beads (FIG. 2).

Example 2.6

Different Functionality on P-Atom and Given Different Capacity/Kinetics

In two separate flasks, 0.2 ml of resin 2 and its oxidized analogue, resin 4, were contacted with a Pd(II) solution (700 ppm initial Pd(II) concentration, 45 ml, pH 0.5). The concentration of Pd(II) in solution is monitored by taking small (50 µl) samples at regular time intervals and analyzing them by ICP. Capture rates were initially identical in time 0-60 min (FIG. 3). Resin 2 displays significantly faster capture rate in the period 60-330 min. After that at t>330 min the resin 4 displays clear saturation at c(Pd)~280-270 ppm, and did not further reduce the Pd(II) concentration. Resin 2 on the other hand, retains its capture activity for much longer (t~2000 min), reducing the Pd concentration down to 60-70 ppm (>90% capture). Thus, the resin 2 captured 44% more Pd than the resin 4, reaching saturation at 1.3 mmol Pd per ml beads, while the resin 4 captured 0.9 mmol Pd per ml. This example clearly shows that the different functionality on the P atom in the resins has dramatic consequences on the resin performance in terms of both, metal capture kinetics and capacity (FIG. 3).

Example 2.7

Different End Groups Giving Different Metal Capture

In three separate flasks, 0.2 ml of resin 2, resin 5a, and resin 11, all having the identical P-amount and functionality on the P-atom, were contacted with a Pd(II) solution (700 ppm initial Pd(II) concentration, 45 ml, pH 0.5). After 16 hours the beads were filtered off and the Pd(II) content in the solution determined by ICP. The remaining Pd(II) concentration was different in all three cases (see FIG. 4), demonstrating the importance of the functionalities of the end groups on the resins for the metal capture.

Example 3

Swelling Properties of Resin 2 Compared to Resin 5

In two separate flasks 2.0 ml of swollen resin 2 and resin 5 were drained, washed 3 times with copious amounts of dry acetone and dried in vacuo. The volumes of dried resins were measured. The volume of resin 2 is reduced by 15% to 1.7 ml, while the volume of resin 5 is reduced to 1.4 ml, making a 30% difference. Upon re-hydration the volume of both resins is the same as at the start, 2.0 ml. This example demonstrates that the structure of the resins has a significant influence on the swelling properties of the bulk material.

The invention claimed is:
1. A method for preparing phosphine-based selective transition metal binding particles, said method comprising at least a step of:
reacting
macroporous particles comprising at least one "NH" reactive function reacted with at least one molar equivalent of R—P(CH$_2$OH)$_2$, in which R is selected from the group consisting of:

—CH$_2$OH;
linear, branched, or cyclic (C$_1$-C$_{25}$)alkyl groups, optionally substituted with one or more of the following substituents:
—C(O)OH,
—C(O)H,
—C(O)R$^1$,
—C(O)OR$^1$,
—NR$^1$R$^2$,
—C(O)SR$^1$,
in which R$^1$ and R$^2$ are, independently of each other, selected in the group consisting of linear, branched, and cyclic (C$_1$-C$_{10}$)alkyl groups;
C$_5$-C$_6$ aryl groups; and
a benzyl group, optionally substituted with one or more substituents selected from the group consisting of linear, branched, or cyclic (C$_1$-C$_{25}$)alkyl or (C$_1$-C$_3$)alkoxy groups, —C(O)OH, —C(O)H, —C(O)R$^1$, —C(O)OR$^1$, —NR$^1$R$^2$, NO$_2$, and —C(O)SR$^1$;
with
a nucleophile reactive agent of formula NHR$^a$R$^b$, wherein R$^a$ and R$^b$ are, independently of each other, selected from the group consisting of:
H;
linear, branched, or cyclic (C$_1$-C$_{25}$)alkyl groups, optionally substituted with at least one moiety selected from the group consisting of —NH$_2$, —C(O)OH, —OH, —C(O)NH$_2$, —SR$^c$ in which R$^c$ is H or CH$_3$, a saturated, unsaturated or aromatic hydrocarbon-based 5 to 9 membered-mono- or bicycle comprising optionally at least one heteroatom chosen from N, O or S;
—C(O)R$^d$ or C(S)R$^d$ with R$^d$ being NH$_2$ or a linear, branched or cyclic C$_1$-C$_{25}$ alkyl optionally substituted with at least one —NH$_2$ moiety;

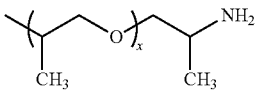

with x ranging from 2 to 70;

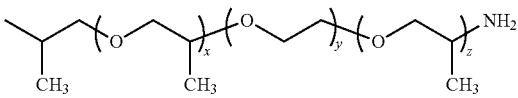

with y ranging from 2 to 40 and x+z ranging from 1 to 6;

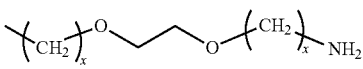

with x being 2 or 3;

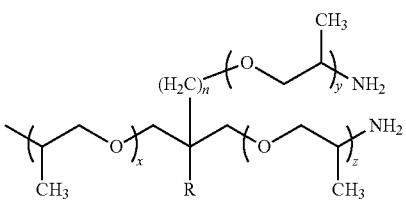

with R being H or Et, n being 0 or 1 and x+y+z ranging from 5 to 90;
with the proviso that NHR$^a$R$^b$ comprises at least one "NH" function.

2. The method according to claim 1, wherein NHR$^a$R$^b$ comprises at least two "NH" functions, comprising an additional subsequent step consisting of: reacting said obtained phosphine-based selective transition metal binding particles with a mole equivalent of R—P(CH$_2$OH)$_2$, in which R is as defined in claim 1.

3. The method according to claim 2, comprising an additional subsequent sequence of steps consisting of:
reacting said phosphine-based selective metal binding particles with a nucleophile reactive agent of formula NHR$^a$R$^b$, wherein NHR$^a$R$^b$ comprises at least two "NH" functions,
further reacting said phosphine-based selective transition metal binding particles with a mole equivalent of R—P(CH$_2$OH)$_2$, and
iterating said sequence of steps for a number of times ranging from 0 to 10.

4. The method according to claim 1, comprising an additional subsequent step consisting of: reacting said phosphine-based selective transition metal binding particles with a sulfurization reagent, in a solvent suitable for swelling said particles and solubilizing said sulfurization reagent.

5. The method according to claim 4, wherein the sulfurization reagent is selected from the group consisting of elemental sulfur, polythiosulphate, or (poly)sulfide ions.

6. The method according to claim 4, wherein said solvent is selected from the group consisting of diethyl ether, tert-butyl methyl ether, tetrahydrofuran, carbon disulfide.

7. The method according to claim 6, wherein said solvent is carbon disulfide.

8. The method according to claim 1, comprising an additional step consisting of: reacting said phosphine-based selective metal binding particle with an oxidation agent.

9. The method according to claim 8, wherein said oxidation agent is hydrogen peroxide.

10. The method according to claim 8, wherein hydrogen peroxide is used at a concentration equal to or lower than 20% (m/m) in water, and the reaction temperature is maintained below 20° C.

11. The method according to claim 1, wherein said macroporous particles are cross-linked organic polymer particles.

12. The method according to claim 11, wherein said organic polymer is selected from the group consisting of polystyrene, polyamide, polyethylene, poly(acrylate), poly(ethylene glycol), as well as their copolymers.

13. The method according to claim 11, wherein said organic polymer is polystyrene particles.

14. A method for preparing phosphine-based transition metal binding particles with oriented selectivity comprising the use of macroporous particles comprising at least one "NH" reactive function reacted with at least one R—P(CH$_2$OH)$_2$, in which R is selected from the group consisting of:
—CH$_2$OH;
linear, branched, or cyclic (C$_1$-C$_{25}$)alkyl groups, optionally substituted with one or more of the following substituents:
—C(O)OH,
—C(O)H,
—C(O)R$^1$,
—C(O)OR$^1$,
—NR$^1$R$^2$, —C(O)SR¹,
in which R¹ and R² are, independently of each other, selected in the group consisting of linear, branched, and cyclic (C₁-C₁₀)alkyl groups;
C₅-C₆ aryl groups; and
a benzyl group, optionally substituted with one or more substituents selected from the group consisting of linear, branched, or cyclic (C₁-C₂₅)alkyl or (C₁-C₃)alkoxy groups, —C(O)OH, —C(O)H, —C(O)R¹, —C(O)OR¹, —NR¹R², NO₂, and —C(O)SR¹;
as a reactive agent.

15. Phosphine-based metal binding particles obtainable according to a method comprising at least a step of:
reacting
macroporous particles comprising at least one "NH" reactive function reacted with at least one molar equivalent of R—P(CH₂OH)₂, in which R is selected from the group consisting of:
—CH₂OH;
linear, branched, or cyclic (C₁-C₂₅)alkyl groups, optionally substituted with one or more of the following substituents:
—C(O)OH,
—C(O)H,
—C(O)R¹,
—C(O)OR¹,
—NR¹R²,
—C(O)SR¹,
in which R¹ and R² are, independently of each other, selected in the group consisting of linear, branched, and cyclic (C₁-C₁₀)alkyl groups;
C₅-C₆ aryl groups; and
a benzyl group, optionally substituted with one or more substituents selected from the group consisting of linear, branched, or cyclic (C₁-C₂₅)alkyl or (C₁-C₃)alkoxy groups, —C(O)OH, —C(O)H, —C(O)R¹, —C(O)OR¹, —NR¹R², NO₂, and —C(O)SR¹;
with
a nucleophile reactive agent of formula NHRᵃRᵇ, wherein Rᵃ and Rᵇ are, independently of each other, selected from the group consisting of:
H;
linear, branched, or cyclic (C₁-C₂₅)alkyl groups, optionally substituted with at least one moiety selected from the group consisting of —NH₂, —C(O)OH, —OH, —C(O)NH₂, —SRᶜ in which Rᶜ is H or CH₃, a saturated, unsaturated or aromatic hydrocarbon-based 5 to 9 membered-mono- or bi-cycle comprising optionally at least one heteroatom chosen from N, O or S;
—C(O)Rᵈ or C(S)Rᵈ with Rᵈ being NH₂ or a linear, branched or cyclic C₁-C₂₅ alkyl optionally substituted with at least one —NH₂ moiety;

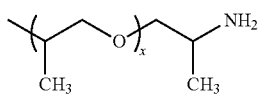

with x ranging from 2 to 70;

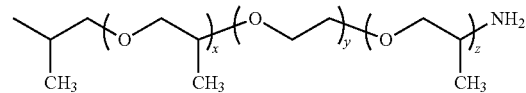

with y ranging from 2 to 40 and x+z ranging from 1 to 6;

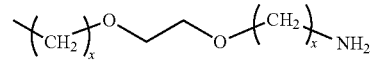

with x being 2 or 3;

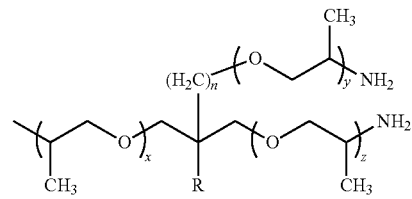

with R being H or Et, n being 0 or 1 and x+y+z ranging from 5 to 90;
with the proviso that NHRᵃRᵇ comprises at least one "NH" function.

16. A method for binding transition metal atoms from an aqueous medium, said transition metal atoms being selected from the group consisting of: Sc, Ti, V, Cr, Mn, Fe, Co, Ni, Cu, Zn, Ga, Ge, As, Se, Y, Zr, Nb, Mo, Tc, Ru, Rh, Pd, Ag, Cd, In, Sn, Sb, La, Hf, Ta, W, Re, Os, Ir, Pt, Au, Hg, Tl, Pb, Bi, Ce, Pr, Nd, Pm, Sm, Eu, Gd, Tb, Dy, Ho, Er, Tm, Yb, Lu, Ac, Th, Pa, U, Np, Pu, comprising the use of phosphine based metal binding particles according to claim 15.

17. The method according to claim 16, wherein said phosphine-based metal binding particles are obtained according to claim 2 and the transition metal atoms are selected from the group consisting of Ru, Rh, Pd, Re, Os, Ir, Pt, Au, Cd and U.

18. The method according to claim 16, wherein the pH of said aqueous medium is set at a value ranging from 0 to 5.

19. A method for capturing transition metal atoms from an aqueous medium, said method comprising at least the steps consisting of:
contacting phosphine-based metal binding particles according to claim 15 with an aqueous medium presumed to contain said transition metal atoms to be captured, in conditions suitable for said capture to occur, and
removing the phosphine-based metal binding particles from said aqueous medium by separating the particles from the aqueous medium.

* * * * *